(12) United States Patent
Ara et al.

(10) Patent No.: US 6,220,966 B1
(45) Date of Patent: Apr. 24, 2001

(54) TORQUE TRANSMITTING AND TORSION DAMPING APPARATUS WITH TORSION DAMPER

(75) Inventors: Hirofumi Ara; Toshio Harima; Daisuke Shibata; Masato Ichinose; Shoichi Tsuchiya, all of Kanagawa (JP)

(73) Assignee: Unisia Jecs Corporation, Atsugi (JP)

( * ) Notice: Subject to any disclaimer, the term of this patent is extended or adjusted under 35 U.S.C. 154(b) by 0 days.

(21) Appl. No.: 09/151,754

(22) Filed: Sep. 11, 1998

(30) Foreign Application Priority Data

Sep. 12, 1997 (JP) .................................................. 9-268137

(51) Int. Cl.⁷ ...................................................... F16D 3/12
(52) U.S. Cl. .............................................................. 464/68
(58) Field of Search .................................. 464/66, 67, 68, 464/93; 192/70.17; 74/574

(56) References Cited

U.S. PATENT DOCUMENTS

| | | | |
|---|---|---|---|
| 902,523 | * 10/1908 | Dalton | 464/66 |
| 2,834,213 | * 5/1958 | Fredericks | 74/574 X |
| 4,727,970 | 3/1988 | Reik et al. | 192/70.17 |
| 4,890,710 | 1/1990 | Reik et al. | 195/71.17 |
| 4,986,398 | * 1/1991 | Olsen | 464/68 X |
| 5,590,752 | * 1/1997 | Takehira et al. | 464/68 X |
| 6,047,804 | * 4/2000 | Feldhaus et al. | 192/70.17 |

FOREIGN PATENT DOCUMENTS 6-97060   10/1986 (JP) .

* cited by examiner

Primary Examiner—Lynne H. Browne
Assistant Examiner—Greg Binda
(74) Attorney, Agent, or Firm—Foley & Lardner

(57) ABSTRACT

A torque transmitting and torsion damping apparatus includes a torsion damper and a friction clutch between a first inertia body and a second inertia body that is supported by said first inertia body for relative rotation. The torsion damper include a drive plate assembly for rotation with the first inertia body, a damper hub for rotation with the second inertia body and spring assembly disposed between the drive plate assembly and the damper hub. At radially inward rivet pins and radially outer projections, the drive plate assembly is fixedly attached to the first inertia body, thereby providing split torque transmission from the first inertia body to the drive plate assembly.

3 Claims, 3 Drawing Sheets

US 6,220,966 B1

TORQUE TRANSMITTING AND TORSION DAMPING APPARATUS WITH TORSION DAMPER

FIELD OF THE INVENTION

The present invention relates to a torque transmitting and torsion damping apparatus for use in motor vehicles.

BACKGROUND OF THE INVENTION

U.S. Pat. No. 4,727,970 (issued Mar. 1, 1988 to Reik et al.), U.S. Pat. No. 4,890,710 (issued Jan. 2, 1990 to Reik et al.), and JP-B 6-97060 (published Nov. 30, 1994) disclose a torque transmitting and torsion damping apparatus. This known apparatus comprises a torsion damper disposed between coaxial first and second inertia bodies, which rotate about an axis with limited relative rotation to each other. The torsion damper include a drive plate assembly and a coupling using rivet pins for connecting a portion of the drive plate assembly in the neighborhood of the outer periphery thereof to the first inertia body. According to this known connection between the first inertia body and the drive plate assembly of the torsion damper, the rivet pins bear stress during transmission of torque. This involves the potential problem that the structural strength accomplished by the first coupling may drop below a satisfactory level under severe operating conditions.

An object of the present invention is to provide a torque transmitting and torsion damping apparatus employing a torsion damper, which provide sufficiently high and stable structural strength between a drive plate assembly of the torsion damper and the adjacent inertia body.

SUMMARY OF THE INVENTION

According to the present invention, there is provided a torque transmitting and torsion damping apparatus comprising:

a first inertia body;

a second inertia body, said first and second inertia bodies being coaxial for rotation about an axis and for relative rotation to each other;

a torsion damper between said first and second inertia body, said torsion damper including a drive plate assembly for rotation with one of said first and second inertia bodies, a damper hub for rotation with the other inertia body, and spring assembly between said drive plate assembly and said damper hub for resiliently allowing relative rotation therebetween, said drive plate assembly having a radially outer periphery and a radially inner periphery, with respect to said axis;

a first coupling disposed in the neighborhood of said radially inner periphery of said drive plate assembly for connecting said drive plate assembly to said one inertia body; and a second coupling disposed in the neighborhood of said radially outer periphery of said drive plate assembly for connecting said drive plate assembly to said one inertia body.

DESCRIPTION OF THE PREFERRED EMBODIMENTS

Figure 1:
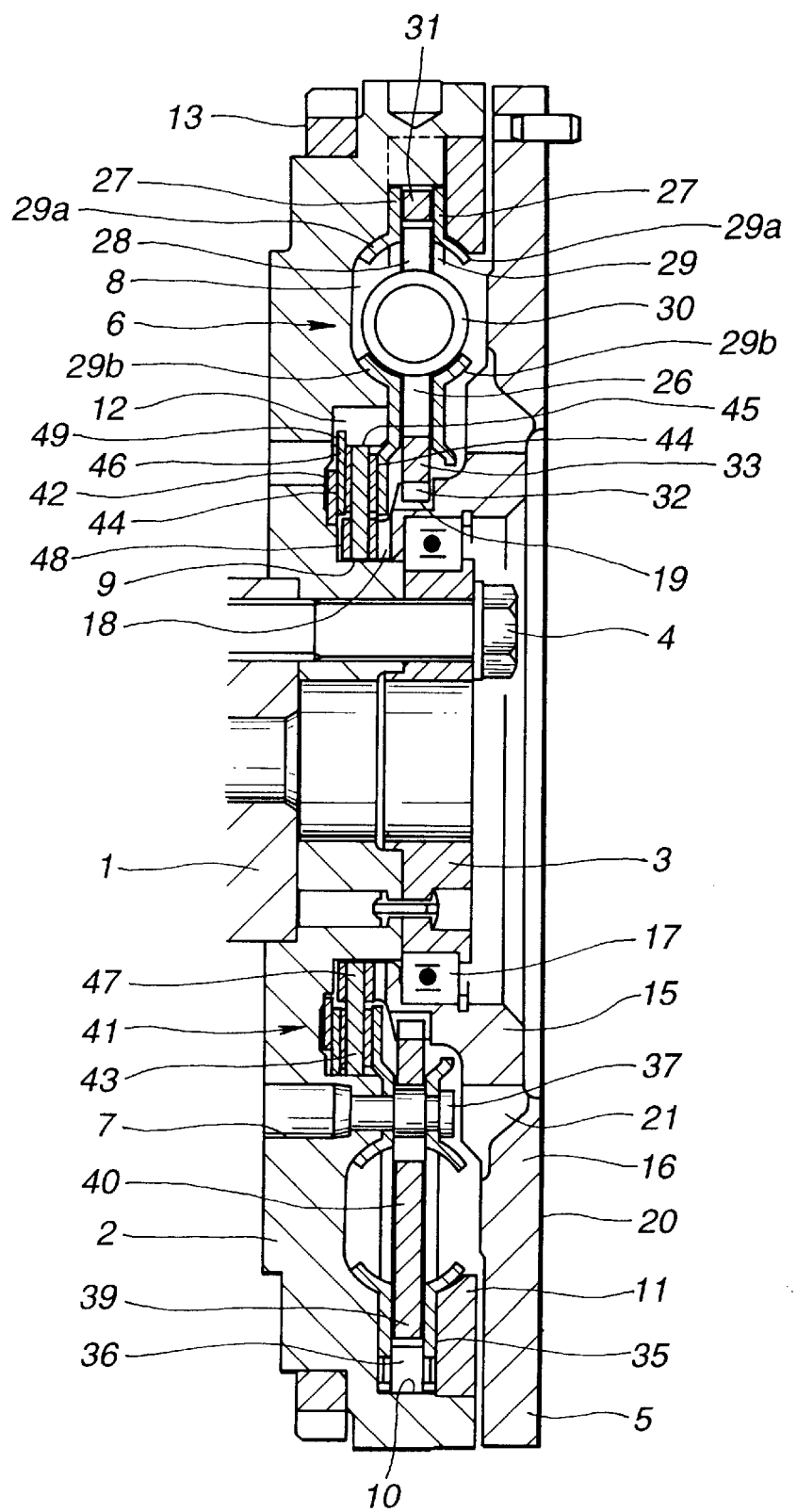
FIG. 1 is an axial sectional view taken along section line 1—1 of FIG. 3, illustrating a torsion damping apparatus according to the present invention.
Figure 2:
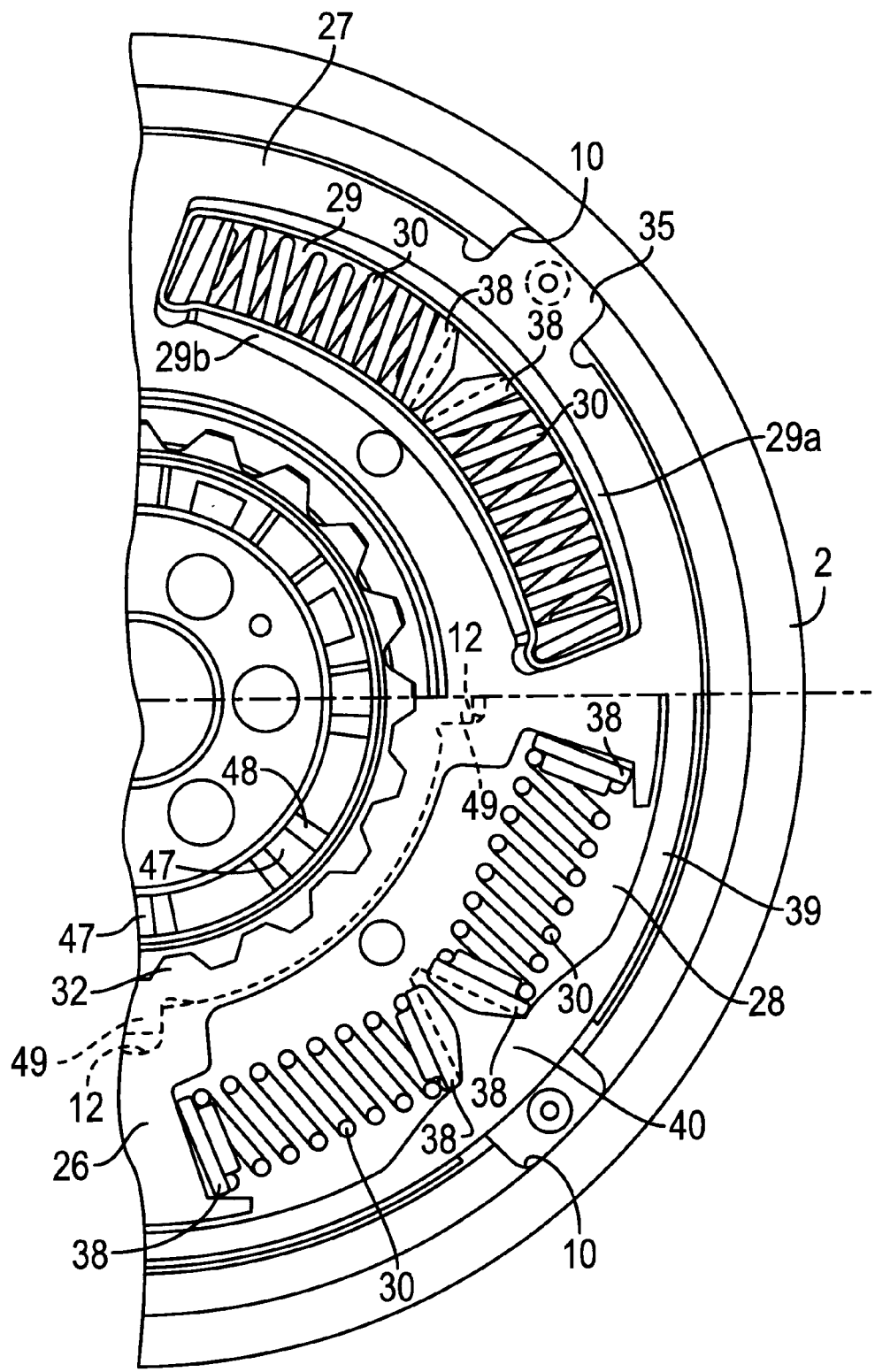
FIG. 2 is a combined view consisting of an upper half, which illustrates the torsion damping apparatus, viewing FIG. 1 from the right, with a second inertia mass and an annular mass removed to expose a drive plate, and a lower half, which illustrates the apparatus with the drive plate removed.
Figure 3:
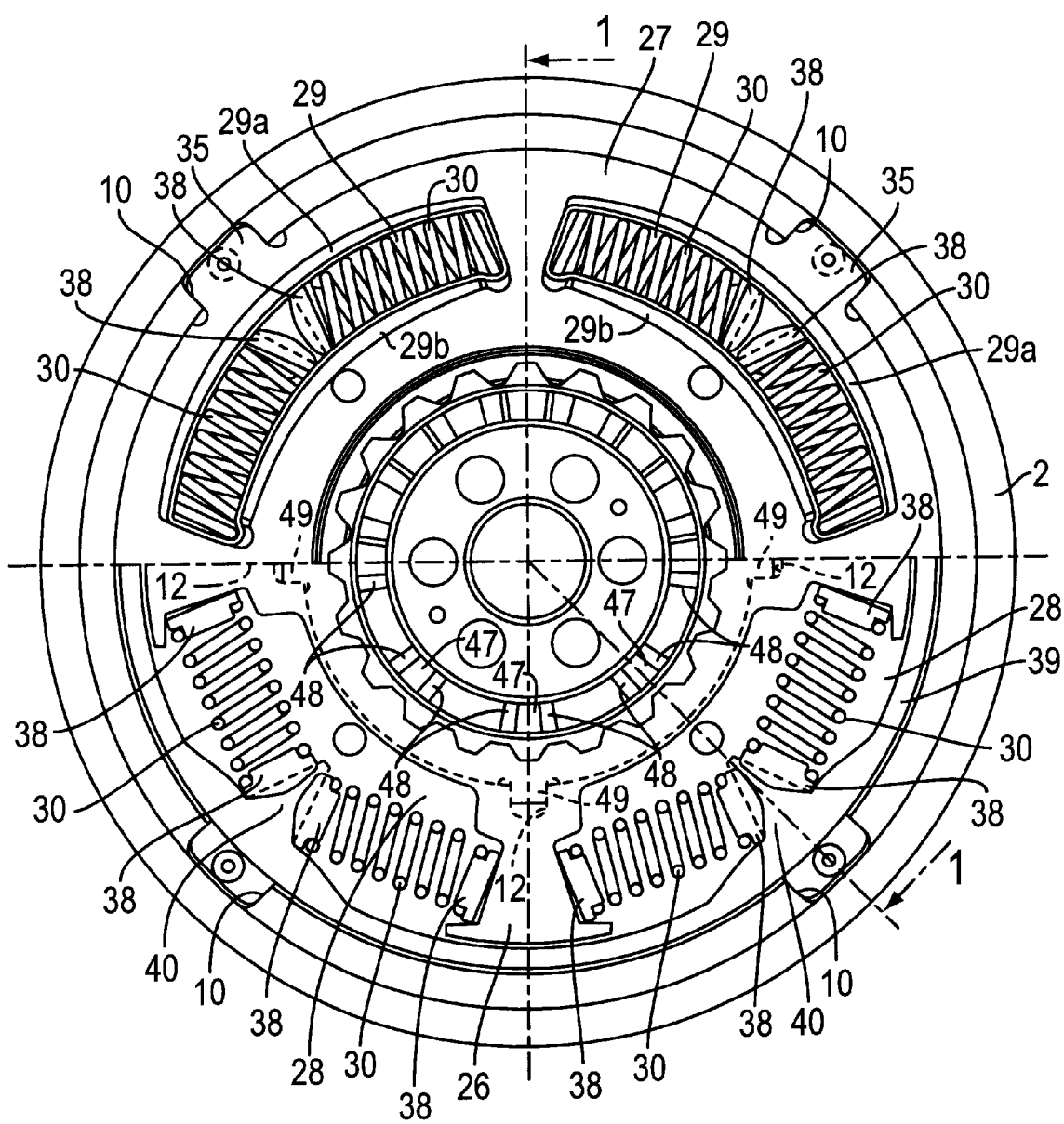
FIG. 3 is a complete view of the arrangement depicted in FIG. 2.

Referring to FIGS. 1 and 2, a torque transmitting and torsion damping apparatus comprises a driving shaft 1, which may take the form of a crankshaft of an internal combustion engine. The apparatus also comprises a first inertia body 2. The first inertia body 2 is held between the adjacent axial end of the driving shaft 1 and a bearing holder 3. A plurality of bolts, only one being shown at 4 in FIG. 1, extend through the bearing holder 3 and first inertia body 2 into the driving shaft 1 to hold them as a unit. The apparatus also comprises a second inertia body 5 that is supported by the first inertia body 2 for relative rotation thereto. This second inertia body 5 is arranged for frictional engagement with a manually operable clutch, not shown. The reference numeral 6 generally designates a torsion damper operatively disposed between the first and second inertia bodies 2 and 5.

Drilled through the first inertia body 2 are a plurality of through holes, only one being shown at 7 in FIG. 1. The first inertia body 2 has a recess 8 formed inwardly from one side thereof that faces the second inertia body 5. At its inner periphery, the recess 8 communicates with an annular groove 9. At its outer periphery, the recess 8 communicates with cutout grooves 10. In this embodiment, the cutout grooves 10 are four (4), in number, and cut inwardly of the first inertia body 2 from the side thereof facing the second inertia body 5 in a direction parallel to an axis of rotation of the driving shaft 1. The cutout grooves 10 are spaced equidistant along the outer periphery of the recess 8, each groove having one end opening within the side facing the second inertia body 5. An annular inertia member 11 is fixedly attached to the side of the first inertia body 2 that faces the second inertia body 5 in such a manner as to close the open ends of the cutout grooves 10. Thus, with the open ends closed by the annular inertia member 11, the cutout grooves 10 are open radially inwardly, with respect to the axis of rotation of the driving shaft 1, into the recess 8. The outer periphery of the annular groove 9 defines the inner periphery of the recess 8. At its outer periphery, the annular groove 9 communicates with cutout grooves 12. The cutout grooves 12, which are four (4), in number, in this embodiment, are cut inwardly of the first inertia body 2 from the bottom of the recess 8 in a direction parallel to the axis of rotation of the driving shaft 1. The cutout grooves 12 are spaced equidistant along the outer periphery of the annular groove 9. A ring gear 13 is fixed to the outer periphery of the first inertia body 2 by shrink fit.

The second inertia body 5 includes a boss 15 and a plate 16 extending radially outwardly from the boss 15. The boss 15 has a bore contacting with a bearing 17 that is held on the bearing holder 3. The bearing 17 supports the second inertia body 5 for relative rotation to the bearing holder 3. Thus, the first inertia body 2 supports the second inertia body 5 for rotation relative thereto since the bearing holder 3 is fixedly bolted to the first inertia body 2.

At its axial end portion, the boss 15 of the second inertia body 5 extends into the annular groove 9 of the first inertia body 2. The axial end portion of the boss 15 is formed with cutout grooves 18. These cutout grooves 18 are spaced equidistant along the inner periphery of the boss 15. At its outer periphery, the boss 15 has external teeth 19.

As shown in FIG. 1, the plate 16 is formed with a friction face 20 for cooperation with a friction disk of the manual clutch. The second inertia body 5 is formed with through holes 21 for the passage of cooling air.

The torsion damper 6, which is operatively disposed between the first and second inertia bodies 2 and 5, is in the neighborhood of the recess 8 of the first inertia body 2. The torsion damper 6 generally comprises a damper hub 26, a pair of drive plates 27, a pair of compression springs 30 disposed in windows 28 and 29 of the damper hub 26 and drive plates 27, and a float 31.

The damper hub 26 is in the form of an annular plate. At its inner periphery, the damper hub 26 has internal teeth 32 fitting into slots between the external teeth 19 of the second inertia body 5. This allows movement of the damper hub 26 along the axis of rotation of the driving shaft 1 relative to the second inertia body 5. The damper hub 26 is formed with four (4) window-like cutouts 28 extending inwardly from its outer periphery.

The drive plates 27 are formed with windows 29, respectively, mating with the window-like cutouts 28 of the damper hub 26. At its outer periphery, each drive plate 27 has projections 35 fitting into the mating cutout grooves 10 of the first inertia body 2. The drive plates 27 have tongue portions 29a and 29b extending outwardly from the radially outer and inner sides of each of the windows 29 for keeping the compression springs 30 within the windows 29.

The drive plates 27 are connected to each other for unitary rotation by means of dowel pins 36 and rivet pins 37. The rivet pins 37 are interference fit in the mating through holes 7 of the first inertia body 2, respectively. Thus, the drive plates 27 are fixedly anchored or attached to the first inertia body 2 with its projections 35 held in the mating cutout grooves 10 and with its rivet pins 37 held in interference fit into the mating through holes 7.

The compression springs 30 are disposed in pair within the windows 28 and 29 as best seen in FIG. 2. Retainers 38 are provided on the opposite ends of the pair of compression springs 30.

The float 31 include an annular portion 39 disposed outwardly of the damper hub 26, and arm portions 40 extending inwardly from the annular portion 39. Each arm portion 40 extend into the mating windows 28 and 29 and acts between the compression springs 30 disposed in pair in the windows 28 and 29 so that the compression springs 30 in each pair are connected and act in series. Thus, in this embodiment, relative rotation of the damper hub 26 to the drive plates 27 is resiliently absorbed by four pairs of compression springs connected in parallel, the compression springs of each pair being connected in series.

The torsion damping apparatus comprises a friction clutch or brake 41, which is operative to give frictional resistance to the relative rotation of the first and second inertia bodies 2 and 5. The friction clutch 41 is accommodated within the annular groove 9 of the first inertia body 2.

As shown in FIG. 1, the friction clutch 41 includes a Belleville spring 42 and a hub 43 with friction pads 44 on both faces thereof. The hub 43 with the friction pads 44 makes a friction plate 45. A pressure plate 46 is disposed between the spring 42 and the friction plate 45. The friction plate 45 is disposed between the pressure plate 46 and the adjacent drive plate 27.

The spring 42, disposed between the bottom of the annular groove 9 and the pressure plate 46, biases, via the pressure plate 46, the friction plate 45 into frictional engagement with the adjacent drive plate 27. Thus, the friction plate 45 is in interference fit between the pressure plate 46 and the drive plate 27.

The hub 43 is in the form of an annular plate. At its inner periphery, the hub 43 has projections 47 extending in a radial inward direction into the mating cutout grooves 18 of the second inertia body 5. A buffer 48 surrounds each of the projections 47. This arrangement prevents the friction plate 45 from rotating relative to the second inertia body 5 about the axis of the driving shaft 1, but allows it to move relative to the second inertia body 5 in the axial direction along the axis of the driving shaft 1. Thus, the friction plate 45 can rotate with the second inertia body 5 as a unit.

The pressure plate 46 is in the form of an annular plate. At its outer periphery, the pressure plate 46 has bent-free projections 49 extending in a radial outward direction into the mating cutout grooves 12 of the first inertia body 2. The projections 49 prevent the pressure plate 46 from rotating relative to the first inertia body 2 about the axis of the driving shaft 1, but allows it to move relative to the first inertia body 2 in the axial direction along the axis of the driving shaft 1. Thus, the pressure plate 45 can rotate with the first inertia body 2 as a unit.

The friction plate 45 is biased into frictional engagement with the drive plate 27. As mentioned before, the drive plate 27 is fixedly anchored to the first inertia body 2 at the projections 35 inserted into the cutout grooves 10 and at the rivet pins 37. From the preceding description, it will now be understood that the friction clutch 41 produces friction between the first and second inertia bodies 2 and 5 during their relative rotation.

According to the torque transmitting and torsion damping apparatus, the driving shaft 1 delivers input torque from the internal combustion engine, for example, to the first inertia body 2. The torsion damper 6 and friction clutch 41 transmit the input torque from the first inertia body 2 to the second inertia body 5. Specifically, the drive plates 27, fixedly anchored at two portions to the first inertia body 2, transmit torque via the damper springs 30 to the damper hub 26 that is connected to the second inertia body 5 for rotation as a unit.

During this torque transmission, each pair of compression springs 10 that are arranged in series in the windows 28 and 29 give a small spring constant, thereby proving a low stiffness and large amplitude in shock absorption. An appropriate amount of torsion resiliency can be accomplished since for pairs of series compression springs are arranged in parallel. The friction clutch 41 produces friction to provide damping action during relative rotation between the first and second inertia bodies 2 and 5.

Referring back to FIG. 1, the torsion damper 6 comprises a drive plate assembly including a pair of drive plates 27, a damper hub 26, and a spring assembly including compression springs 30. The drive plate assembly 27 has a radially outer periphery and a radially inner periphery, with respect to the axis of the driving shaft 1. A first coupling is disposed in the neighborhood of the radially inner periphery of the drive plate assembly 27 for connecting the drive plate assembly to the first inertia body 2. A second coupling is disposed in the neighborhood of the radially outer periphery of the drive plate assembly 27 for connecting the drive plate assembly 27 to the first inertia body 2.

The first coupling includes a plurality through holes 7 formed through the first inertia body 2, and a plurality of rivet pins 37, each rivet pin extending through the drive plate assembly into one of the through holes 7. The second coupling includes a plurality of projections 35 on the radially outer periphery of the drive plate assembly 27, and a plurality of cutout grooves 10 formed into the first inertia body for receiving said plurality of projections 35, respectively.

It will be appreciated from the preceding description that the first and second couplings provide two paths of torque transmission from the first inertia body 2 to the drive plate assembly 27, thereby providing stable torque transmission with sufficiently high structural strength over the extended period of use. Thus, the rivet pins 37 are no longer suffered from local stress concentration.

It will also be appreciated that assembly of the drive plate assembly 27 with the first inertia body 2 is accomplished by axially inserting the projections 35 into the cutout grooves 10.

The projections 35 are arranged on the outer periphery of the drive plate assembly 27 and extend radially outward therefrom. The drive plate assembly 27 is easy to be machined because the projections 35 are not bent. Since the length of torque arm during torque transmission via the projections 35 is relatively long, the stress, which the projections bear, is low.

In the preceding embodiment, the drive plate assembly includes two drive plates 27. The present invention may be applied to a drive plate assembly using a single drive plate.

What is claimed is:

1. A torque transmitting and torsion damping apparatus comprising:

a first inertia body;

a second inertia body, said first and second inertia bodies being coaxial for rotation about an axis and for rotation relative to each other;

a torsion damper between said first and second inertia bodies, said torsion damper including a drive plate assembly for rotation with one of said first and second inertia bodies, a damper hub for rotation with the other inertia body, and a spring assembly between said drive plate assembly and said damper hub for resiliently allowing relative rotation therebetween, said drive plate assembly having a radially outer periphery and a radially inner periphery, with respect to said axis;

a first coupling for connecting said drive plate assembly to said one inertia body; and a second coupling disposed radially outwardly of said first coupling, for connecting said drive plate assembly to said one inertia body, said second coupling including a plurality of projections on said drive plate assembly, and a plurality of cutout grooves formed into said one inertia body for receiving said plurality of projections, respectively.

2. The apparatus as claimed in claim 1, wherein said first coupling includes a plurality of through holes formed through said one inertia body, and a plurality of rivet pins, each rivet pin extending through said drive plate assembly into one of said through holes of said one inertia body.

3. The apparatus as claimed in claim 2, wherein said plurality of projections are arranged on said radially outer periphery of said drive plate assembly and extend radially outward, with respect to said axis.

\* \* \* \* \*